United States Patent [19]

Berggren

[11] Patent Number: 5,247,616
[45] Date of Patent: Sep. 21, 1993

[54] COMPUTER SYSTEM HAVING DIFFERENT COMMUNICATIONS FACILITIES AND DATA TRANSFER PROCESSES BETWEEN DIFFERENT COMPUTERS

[75] Inventor: Christina E. Berggren, Appalachin; Frank T. Kozuh, Owego, both of N.Y.

[73] Assignee: International Business Machines Corporation, Armonk, N.Y.

[21] Appl. No.: 875,010

[22] Filed: Apr. 27, 1992

Related U.S. Application Data

[63] Continuation of Ser. No. 425,763, Oct. 23, 1989.

[51] Int. Cl.$^5$ .............................................. G06F 13/00
[52] U.S. Cl. ............................ 395/200; 364/271.7; 364/228; 364/228.1; 364/242.3; 364/242.32; 364/242.33
[58] Field of Search ............... 364/271.7, 228, 200, 364/900, 242.3, 242.32, 242.33, 228.1; 395/200

[56] References Cited

U.S. PATENT DOCUMENTS

| | | | |
|---|---|---|---|
| 4,062,059 | 12/1977 | Suzuki et al. | 364/200 |
| 4,161,778 | 7/1979 | Getson | 364/200 |
| 4,212,057 | 7/1980 | Devlin et al. | 364/200 |
| 4,229,790 | 10/1980 | Gilliland et al. | 364/200 |
| 4,335,426 | 6/1982 | Maxwell et al. | 364/200 |
| 4,363,093 | 12/1982 | Davis et al. | 364/200 |
| 4,414,620 | 11/1983 | Tsuchimoto et al. | 364/200 |
| 4,425,645 | 1/1984 | Weaver et al. | 371/47 |
| 4,443,850 | 4/1984 | Harris | 364/200 |
| 4,445,176 | 4/1984 | Burk et al. | 364/200 |
| 4,454,383 | 6/1984 | Judd | 178/3 |
| 4,489,379 | 12/1984 | Lanier et al. | 364/200 |
| 4,503,496 | 3/1985 | Holzner et al. | 364/200 |
| 4,506,324 | 3/1985 | Healy | 364/200 |
| 4,507,779 | 3/1985 | Barner et al. | 370/100 |
| 4,509,119 | 4/1985 | Gumaer et al. | 364/200 |
| 4,524,445 | 6/1985 | Fujii | 371/47 |
| 4,517,671 | 2/1986 | Burns et al. | 364/200 |
| 4,577,273 | 3/1986 | Hopper et al. | 364/200 |
| 4,623,997 | 11/1986 | Tulpule | 370/85 |
| 4,641,262 | 2/1987 | Bryan et al. | 364/900 |
| 4,680,765 | 7/1987 | Doland | 371/42 |
| 4,692,894 | 9/1987 | Bemis | 364/900 |
| 4,709,328 | 11/1987 | Anthony, Jr. et al. | 364/200 |
| 4,720,782 | 1/1988 | Kovalcin | 364/200 |
| 4,757,446 | 7/1988 | Trottier et al. | 364/200 |
| 4,768,150 | 8/1988 | Chang et al. | 364/300 |
| 4,796,255 | 1/1989 | Westbrook et al. | 370/100 |
| 5,072,371 | 12/1991 | Benner et al. | 395/200 |

FOREIGN PATENT DOCUMENTS

| | | |
|---|---|---|
| 080890 | of 0000 | European Pat. Off. |
| 6331247 | of 0000 | Japan |
| 6381553 | of 0000 | Japan |
| 63141156 | of 0000 | Japan |
| 57-89358 | 4/1982 | Japan |
| 2001463 | of 0000 | United Kingdom |

OTHER PUBLICATIONS

Personal Computer AT/370 Hardware Reference Library.
VM/Pass-Through PC Connect Facility PRPQ No. P10024 Guide & Reference.

(List continued on next page.)

*Primary Examiner*—Dale M. Shaw
*Assistant Examiner*—Diane E. Smith
*Attorney, Agent, or Firm*—Arthur J. Samodovitz

[57] ABSTRACT

A computer system is disclosed in which different type of communication links are provided between different computers. A high speed data communication link between a personal computer (PC) and a midrange computer is disclosed. An application is run on the midrange computer, and simultaneously a different but related application is run on the PC. Then, the PC initiates a write command to write data from the PC to the midrange computer without prior direction from the midrange computer to initiate the write command. Next, the data is written into a buffer pool memory based on memory resident indicators whereby no channel program is required. This expedites the data transfer. The midrange computer application subsequently reads the data from the buffer pool memory. A master/slave relationship is also provided between the midrange computer and another computer or external device for more controlled data communications.

6 Claims, 9 Drawing Sheets

OTHER PUBLICATIONS

VM/Pass-Through PC Connect Facility PRPQ No. P10085 PC Work Station Application Programmer's Guide.

VM/Pass-Through PC Connect Facility PRPQ No. P10084 8232 Communications Program Installation Procedures IBM 8232 LAN Channel Station Operator's Guide.

IBM 8232 LAN Channel Station Installation & Testing.

Virtual Machine/Pass-Through Facility Managing & Using (Release 4).

Systems Directions Pocket Guide—IBM Corp.

IBM VM/PC Toolkit—Base User's Guide—IBM Corp.

IBM VM/PC Toolkit—VDI Graphics P81014—IBM Corp.

COMPUTER SYSTEM HAVING DIFFERENT COMMUNICATIONS FACILITIES AND DATA TRANSFER PROCESSES BETWEEN DIFFERENT COMPUTERS

This application is a continuation of application Ser. No. 07/425,763, filed Oct. 23, 1989.

BACKGROUND OF THE INVENTION

The invention relates generally to computer systems, and deals more particularly with a computer system in which different communication links are provided between a first computer and other processors within the system.

Heretofore, computer systems have included a host or main computer such as an IBM (registered trademark of IBM Corporation) 3090 mainframe or 4381 midrange computer with IBM 370 architecture, and a plurality of associated personal computers (PC's) operating as video display terminals (VDT). Each video display terminal comprises the hardware of a personal computer, and provides access to a host computer program loaded and run in the host computer while the VDT is connected to the host computer as an I/O terminal. In this prior art system, the host computer is the master, and initiates and controls all communications between the host computer and the VDT. To make a data transfer from the VDT to the host computer, the host computer must request the data from the VDT and inform the VDT of the location where the data will be received in the memory of the host computer. By prescribing the address, the host computer protects the remainder of its memory. Then the VDT can transmit the data to an I/O controller for the host computer. The I/O controller operates asynchronously relative to the VDT, and after receipt of the data, queues this work request for use of a memory bus leading to the host computer memory. Then, the I/O controller can write the data into the host computer memory. In the foregoing mode of operation of this system, there is only one application running, i.e. the application running on the mainframe, and the VDT serves as an I/O terminal.

It is possible in the foregoing system to disconnect any or all of the "VDT's" from the mainframe or midrange computer and operate it as a PC, and load a PC type of program into the PC. In this mode of operation, an application running on the PC cannot transfer data to an application running on the host computer.

It is also known in the prior art to allow a program running in the mainframe or midrange computer to exchange data with a program running in a PC by emulating the action of a VDT data exchange. In this case, the mainframe or midrange program writes data to the PC program using the same methods used to send data to the VDT. The data is, however, routed to the PC program instead of being displayed on a VDT. Similarly, the PC program sends data to the mainframe or midrange program by making the data appear to have been typed at a VDT. As an example of this technology, the IBM 3270 Data Stream described in "IBM 3270 Information Display System Data Stream Programmer's Reference" (GA23-0059), has been used by numerous vendors to achieve data transfer between PC's and mainframe or midrange computers. In these cases, the mainframe or midrange computer controls the transfer by using the same master/slave relationship used to control VDT's.

Heretofore, a prior art CETI (trademark of IBM Corporation) computer system comprised a mainframe or midrange computer with IBM 370 architecture, a Token Ring Adapter—I/O port, and a communication link therebetween. The I/O port could interface to a PC, and the PC could run an application at the same time that the mainframe computer runs an application. Under these conditions, either computer could transfer data to the other computer. This is advantageous in certain cases because it allows efficient interaction with intelligent devices.

In this CETI system, the mainframe computer includes in mainframe memory a channel program which controls the data transfer from the PC to the mainframe computer. The channel program comprises a sequential list of control words to control the data transfer. Each control word comprises (1) a command code such as Read, Write, etc., to define the type of transaction, (2) a data address to indicate the location for a Read, Write, etc. operation, (3) a set of flags such as stop, continue, etc. and (4) length information to indicate the length of the Read or Written Record. The control words in the list and the order of the words are predetermined and not alterable during operation. Consequently, the PC application cannot transfer data to the mainframe computer until the mainframe reaches the next "read" control word in the sequence. This regimentation of the channel program and the master/slave relationship of the mainframe computer to the PC delays such a data transfer. Also, this transaction is further slowed by the requirement to read each component of the word, check the validity of each component, and tailor the execution of the command to the parameters of the control word.

Accordingly, a general object of the present invention is to provide a computer system having a main computer, a high speed communication link connected between the main computer and a second computer, and a more controlled communication link connected between the main computer and a third computer.

A more specific object of the present invention is to provide a high speed communication link of the foregoing type which can be used with a computer having a 370 or other master/slave architecture.

Another specific object of the present invention is to provide a high speed communication link of the forgoing type which can be used between a relatively large mainframe or midrange computer and a relatively small personal computer, and permits the personal computer to run an application and initiate a data transfer to the mainframe or midrange computer in a peer-to-peer relationship.

SUMMARY OF THE INVENTION

The invention resides in a process and apparatus for providing two types of communications systems in one computer system. A high speed data communication link is provided between a first computer and a second, different type of computer. The first computer can be a personal computer and the second computer can be a midrange computer. An application is run on the second computer, and simultaneously a different but related application is run on the first computer. Then, the first computer initiates a write command to write data from the first computer to the second computer without prior direction from the second computer to initiate the write command, a peer-to-peer relationship. Next, the data is written into a buffer pool memory. The application of the second computer subsequently reads the data from the buffer pool memory. The application running on the second computer also controls a data transfer to a third computer in a master/slave relationship.

The apparatus comprises various communication facilities for the high speed communication link including two types of bus control units. Another high speed communications facility comprises a first private memory dedicated and connected to the first computer, a second private memory dedicated and connected to the second computer, and a shared memory connected to both the first and the second computers. The second computer includes means for directly accessing the shared memory, and the first computer also includes means for directly accessing the shared memory, whereby either of the computers can transfer data to the other computer by transferring data to the shared memory.

DETAILED DESCRIPTION OF THE PREFERRED EMBODIMENTS

Figure 1:
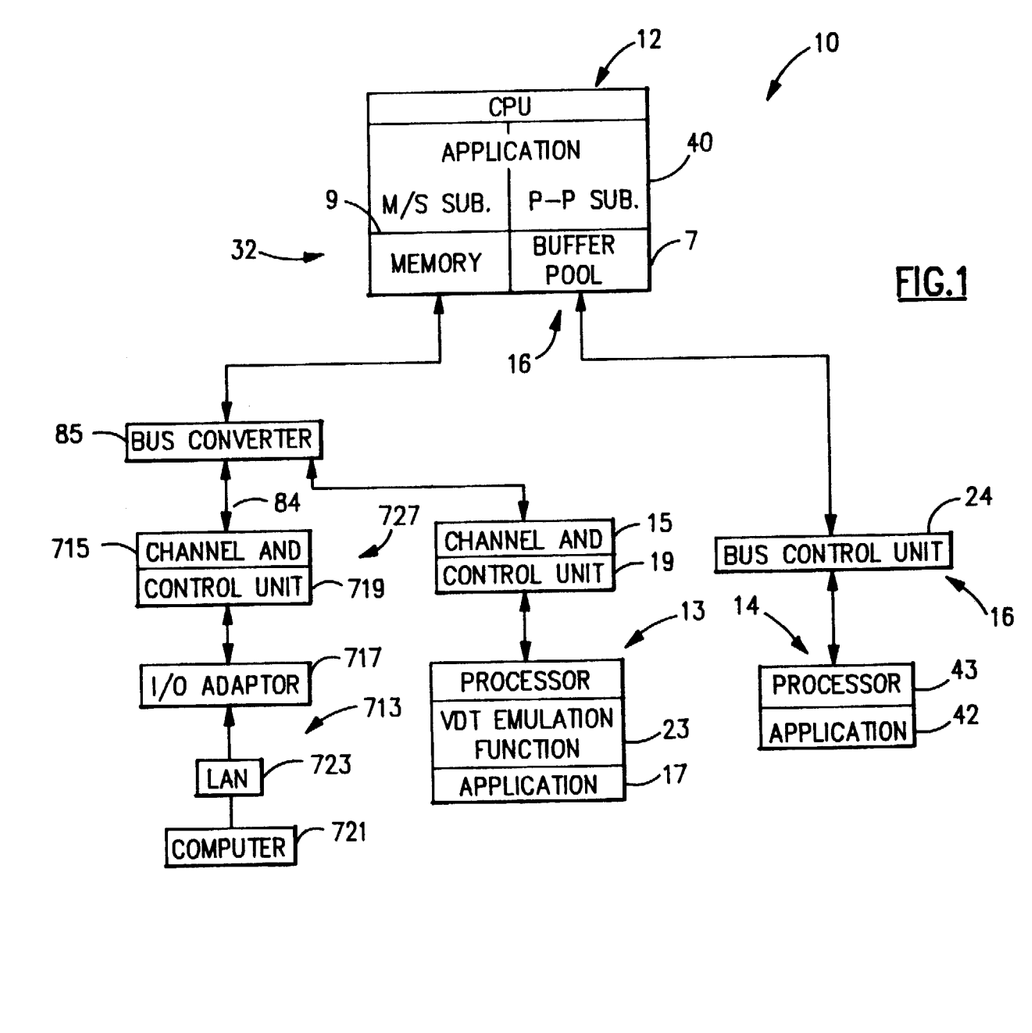
FIG. 1 is a high level block diagram of a computer system according to the present invention.

Referring now to the drawings in detail wherein like reference numerals indicate like elements throughout the several views, FIG. 1 illustrates a computer system generally designated 10 in accordance with one embodiment of the present invention. System 10 includes a midrange computer 12, a personal computer 14, and a high speed communication link or pipeline 16 therebetween. The communication link comprises a bus control unit 24 external to computer 12, and a buffer pool 7 within computer 12. System 10 also includes at least one other external device such as another personal computer 13 emulating a VDT. Alternately, another device 713 comprises an I/O adapter 717 connected to a token ring or Ethernet local area network (LAN) 723 operating in a CETI architecture, and another computer 721 connected to the LAN. Each I/O channel and control unit 27 and 727 has access to main memory 9 within computer 12. Computer 12, by means of a subroutine of application 40, has a master/slave relationship to devices 713 and 13 in that read and write operations are paced or dictated, respectively by channel programs residing in computer 12, and computer 12 dictates the locations in memory 9 affected by the read and write operations. However, computer 12, by means of another subroutine of application 40, has a peer-to-peer relationship with PC 14 in that either computer 12 or 14 can initiate a data transfer to the other computer 14 or 12, and the data is transferred via intermediary buffer pool 7 without requiring a channel program, which buffer pool is directly accessible by either computer. By way of example, the midrange computer 12 is an IBM 9371 computer Model 10 with System/370 architecture and a System/370 instruction set relative to devices 713 and 13, and computer 14 is an IBM PS/2 ("PS/2" is a trademark of IBM Corporation) computer (20 megahertz PS/2 Model 80 derivative). The basic hardwares and architectures for these two computers are further described in publications entitled "IBM System/370 Principles of Operation" Eleventh Edition, IBM Corporation order number GA22-7000, published September 1987 by IBM Corporation of Armonk, N.Y. and "Personal Systems/2 Hardware Interface Technical Reference" IBM Corporation order number S68X-2330 published May, 1988 by IBM Corporation of Armonk, N.Y., respectively. Chapter 13 of "IBM System /370 Principles of Operation" manual relating to Input/Output operations is hereby incorporated by reference as part of the present disclosure.

Figure 2:
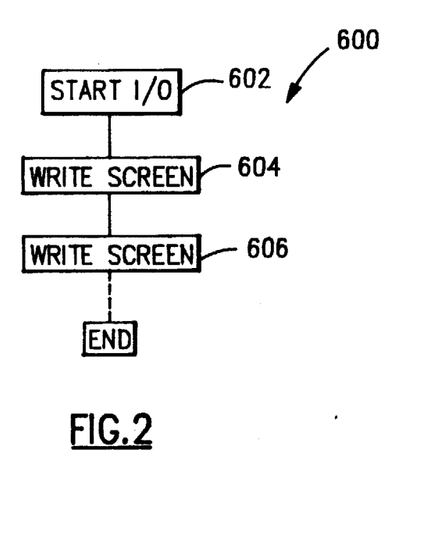
FIGS. 2-3 are flowcharts illustrating channel programs initiated by a midrange computer to control a data transfer with one other device of FIG. 1.

The external device 13 is a PC that is running an application 17 which uses a form of VDT emulation (IBM 3270 emulation) to transfer data to and from application 40 running on processor 12. To accomplish this, a subroutine of application 40 constructs and initiates channel programs 600 and 610 for write and read operations shown in FIGS. 2 and 3, respectively. For a write operation to the external device 13, application 40 constructs in memory 9 a data area that observes the IBM 3270 Data Stream format rules with the data to be transferred occupying certain positions. Next, application 40 constructs and initiates channel program 600 that causes the contents of the data area to be sent via bus connector 85 and channel 15 to the control unit 19, which transmits the data to the VDT emulation function 23 in external device 13. The channel program 600 contains multiple write commands 604, 606 depending on the buffering characteristics of the control unit 19. After the data has arrived at the buffer of the VDT emulation function 23, it is made available to the application 17, which extracts the data by use of the IBM 3270 Data Stream format rules.

Figure 3:
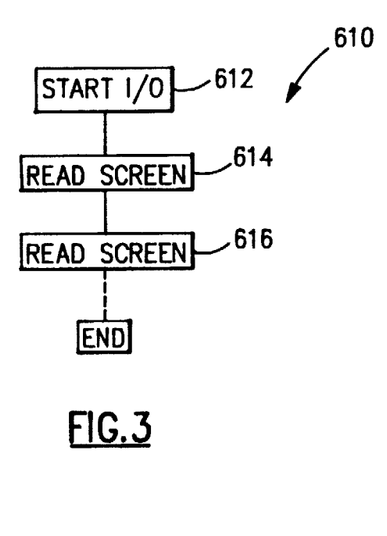

For a read operation from the external device 13, application 40 clears a buffer in memory 9 and constructs and initiates channel program 610 (including read commands 614 and 616) that causes the intent to read to be sent via the bus converter 85 and channel 15 to the control unit 19, which enables input from the VDT emulation function 23 in in external device 13. In order for the read to complete successfully, application 17 must make available to the VDT Emulation function a buffer observing IBM 3270 Data Stream format rules and containing the desired data. After this is done, the VDT emulation function 23 forwards the contents of the buffer to control unit 19 for eventual return to memory 9. When the data has arrived in memory 9, the application 40 is notified by an I/O interrupt, after which the desired data is removed from the buffer.

For data transfer with device 713, processor 12 initiates a continuously executing transfer interface (CETI) program 58 (FIG. 4) to control data transfer to and from device 13 in a master/slave relationship. Channel program 58 begins with a transmission of a start I/O command 89 to channel 715 identifying control unit 719. In response to CWRITE 90 the channel recognizes from the channel control word whether the data is chained or singular, recognizes whether the command is chained or singular, verifies that the channel control word is valid, and also performs other functions. If the command is a single WRITE command, then the channel notices which device is being addressed by the channel control word and the corresponding port as viewed from the processor 12. Then, the channel 715 passes the WRITE command to control unit 719, and control unit 719 executes steps of microcode corresponding to the CWRITE command. First, control unit 719 gets the control block from channel 715, and then processes the control block. During the course of these steps, the control unit requests data from channel 715, and channel 715 fetches the data from memory 9. When control unit 719 receives the data, control unit 719 signals an outbound port to run i.e. to transfer the data to LAN 723 via adapter 717.

Figure 4:
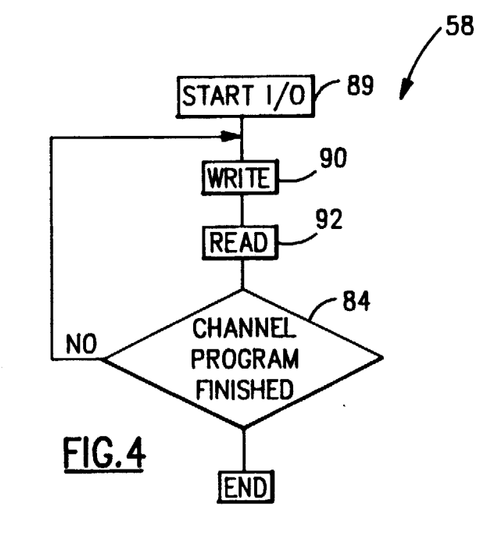
FIG. 4 is a flowchart illustrating another channel program initiated by the midrange computer to control a data transfer with still another device of FIG. 1.

When the channel control word is READ command 92, control unit 719 determines if the corresponding device has data available to transfer to memory 9. If so, control unit 719 executes steps of microcode to fetch the data from the device, signal the inbound data port to run and pass the data to channel 15. The read or write data transfer continues unless an interrupt condition occurs such as an overload condition. A universal control unit is described in copending patent application Ser. No. 07/425,780, Protocol For Communication With a Plurality Of I/O Adapters, And The I/O Adapters Having Other I/O Program Protocols For Communication with Different Devices filed Oct. 23, 1989 by John J. Erhard et al.

Figure 5:
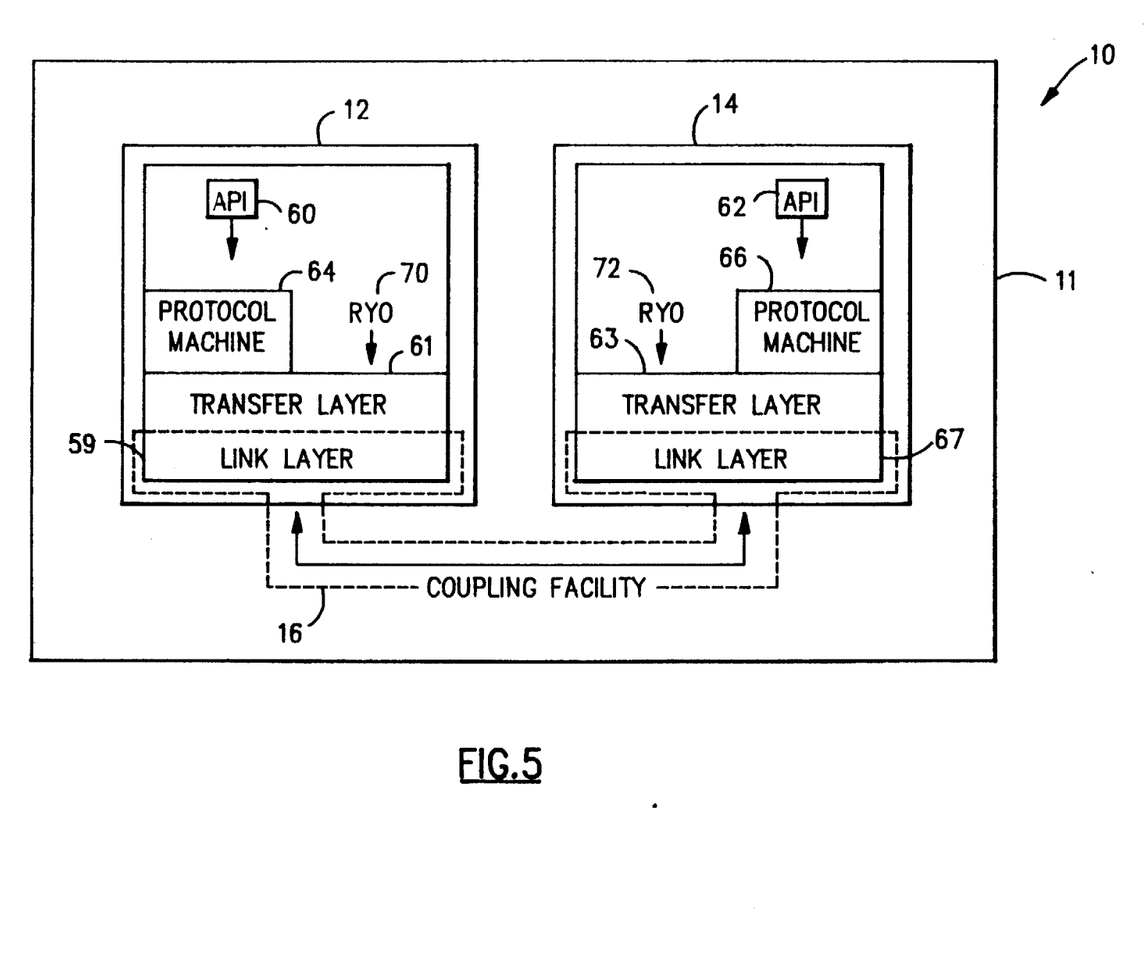
FIG. 5 is a block diagram illustrating in more detail the midrange computer, high speed communication link, and personal computer of FIG. 1.

Considering now the relationship between computers 12 and 14, as further illustrated in FIG. 5, computer 12 includes a standard Application Program Interface (API) 60 and computer 14 includes a standard API 62. The standard API's are further described in a publication entitled "Systems Application Architecture Common Programming Interface for Communications": IBM Corporation order number SC2604399, published October 1988 by IBM Corporation of Armonk, N.Y. Protocol machines 64 and 66 establish a high level communications protocol or software bridge between a respective application program interface (API) 60 or 62. In addition, a low level interface 61 or 63, respectively is included to permit a user to define his or her custom set of protocols ("roll your own" protocols) 70 or 72 for computers 12 and 14.

Transfer layers 61 and 63 form an open communications architecture which routes data and ensures that data is actually received at the opposite end of communication link 16 (or elsewhere if other processors are connected). For example, if an application in computer 12 wants to transmit thousands of bytes of data, then transfer layer 61 packetizes the data into a manageable size and adds headers to determine routing and sequencing of the packets. Transfer layer 63 serves a similar function. As described in more detail below, communications link 16 includes hardware, software and cabling to interconnect the two computers 12 and 14.

Figure 6:
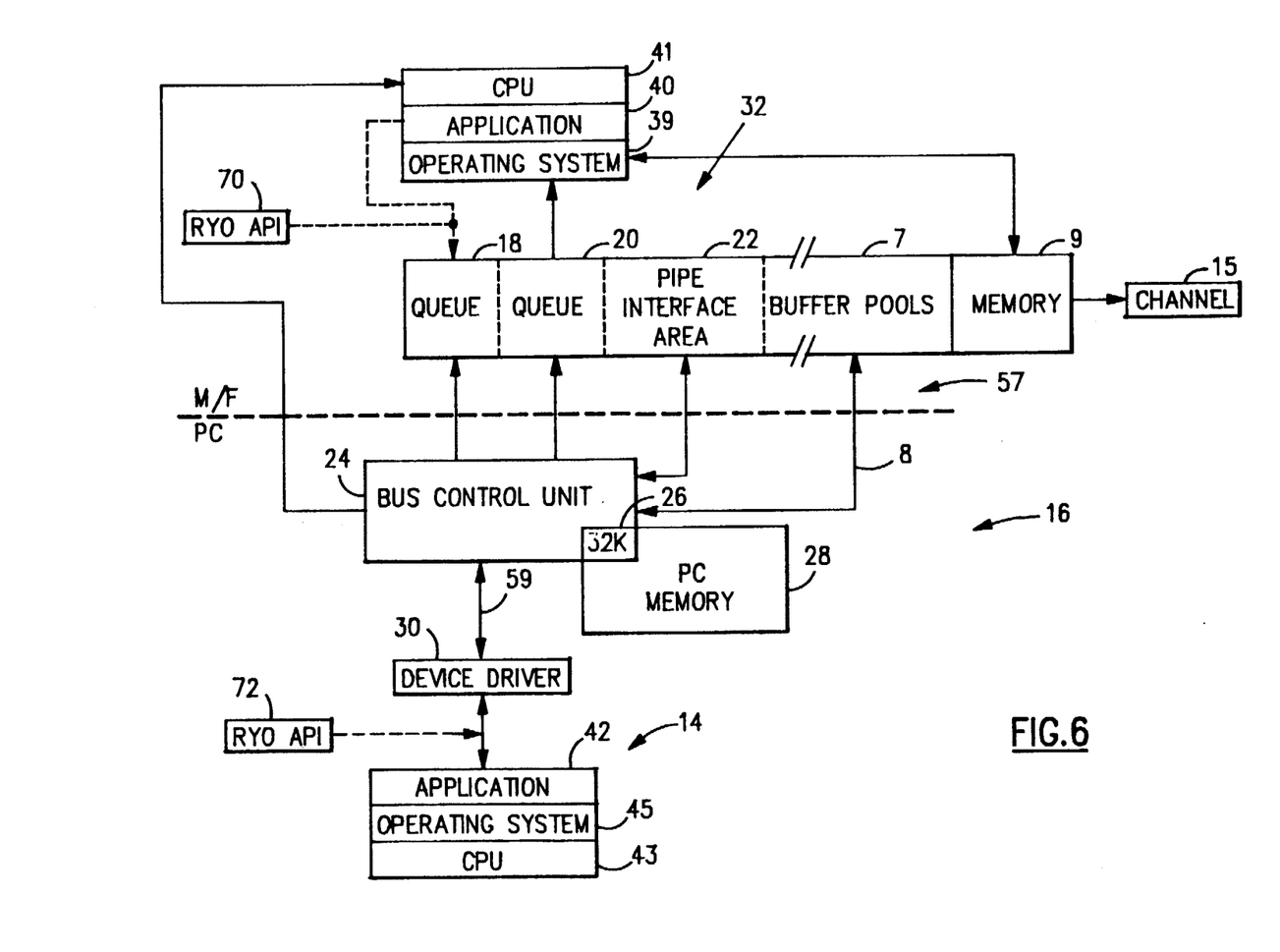
FIG. 6 is a lower level block diagram of an application running on and CPU and memory within the midrange computer, the high speed communication link, and an application running on and CPU and memory within the personal computer of FIG. 1.

As illustrated in FIG. 6, midrange computer 12 includes operating system 39 and can run program or application 40, and personal computer 14 includes operating system 45 and can run PC program or application 42. Different operating system combinations can exist in system 10. For example, midrange computer 12 can utilize VM/SP, VSE, or DPPX (all trademarks of IBM Corporation) operating systems, and personal computer 14 can execute PC-DOS, OS/2, or AIX/386 (all trademarks of IBM Corporation) operating systems. The two computers can run their programs simultaneously. During the course of running both programs, application 42 can transmit data to computer 12. Such transmission is made via communication link 16, and application 42 can initiate the data transfer, i.e. there is a peer-to-peer relationship in this respect between the two computers.

Communication link 16 comprises address queues 18 and 20, pipe interface area 22 of memory 32, bus control unit 24, shared memory portion 26 of PC memory 28, and device driver 30. In the illustrated embodiment, both transfer layer 63 and link layer 67 of FIG. 5 are contained in device driver 30. Bus control unit 24 shares portion 26, for example 32K bytes of memory 28, with CPU 43. Queues 18 and 20 and pipe interface area 22 are located in the midrange computer, whereas, memory 28 and device driver 30 are located within the personal computer. Bus control unit 24 comprises a separate processor (for example a 68000 model), other hardware and software.

Figure 7:
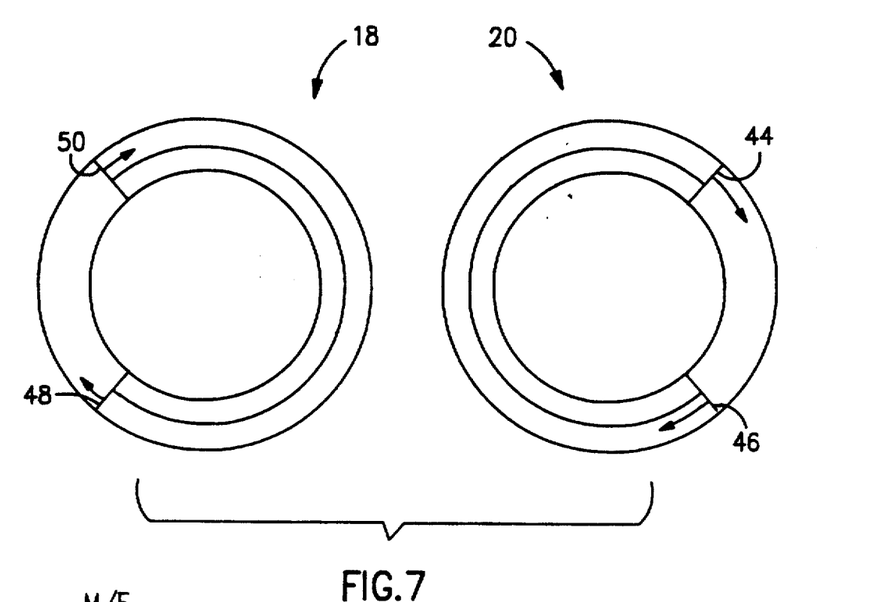
FIG. 7 is a schematic diagram of buffer pool memories within the midrange computer memory of FIG. 6, which buffer pool memories receive data transferred through the high speed communication link.

As illustrated in FIG. 7, queue 20 is arranged as a circular first-in first-out (FIFO) list of buffer pool addresses. Bus control unit 24 inputs or writes data at an end 44 of the FIFO, and application 40 reads and withdraws data from a beginning 46 of the FIFO (via protocol machine 64 or RYO interface 70). The locations of the end 44 and beginning 46 of the buffer pool 20 constantly change as data is written into and read from the buffer pool, and the locations of both are stored in the pipe interface area 22 as pointers or indexes to the queues 18 and 20. The addresses in queue 20 identify locations in buffer pools 7 in memory 32 which buffer pools 7 actually store. Because queue 20 is in the form of a FIFO, bus control unit 24 can write data into the buffer pool at the same time that the midrange computer withdraws information, and vice versa. Only when the queue 20 is full or empty is the action of one of the computers delayed. When the queue 20 is empty, transfer layer 61 cannot currently read data from the buffer pool 7. However, when the next block of data is written into buffer pool 7, an interrupt signal is sent to transfer layer 61 to resume the extraction of data from buffer pool 7. When buffer pool 7 is full, transfer layer 63 cannot currently write into the buffer pool. However, when transfer layer 61 extracts the next block of data from buffer pool 7, an interrupt signal is sent to device driver 30 as a message via bus control unit 24 indicating that buffer pool 7 now has room to receive additional data.

Queue 18 is arranged similarly to queue 20 but controls the receipt of data from the midrange computer and transmission of data to the PC. The midrange computer writes into the buffer pool at a location indicated by an end 48, and the bus control unit reads data from the buffer pool at a location indicated by beginning 50. Another circular list of end and beginning pointers or indexes for queue 18 is also stored in pipe interface 22. Because of the use of queues 18 and 20 and corresponding buffer pools 7, the remainder 9 of memory 32 is protected from personal computer 14.

Referring again to FIG. 6, CPU 41 within midrange computer 12 interfaces to both queues 18 and 20 with a single I/O device address. The device address is used to initialize the link interface ("prepare pipe"), notify the personal computer of changes to empty or full status of the queues, and allow the personal computer to indicate status change interrupts to the midrange computer.

Bus control unit 24 provides a bus-to-bus adapter which interfaces an I/O bus 57 of the midrange computer to a PC internal bus such as a Micro Channel (registered trademark of IBM Corp.) internal bus 59. The shared memory 26 of bus control unit 24 is mapped directly into the PC memory. The memory provides a storage area from and into which the PC application's requests to read and write data are satisfied. Bus control unit 24 is responsible for the actual transfer of data between the midrange computer and the personal computer, and moves the data to and from buffer pools 7 (via line 8 and I/O bus 57) in response to the commands from the personal computer device driver 30. In the illustrated embodiment, device driver 30 is software which runs on the PC CPU 43.

Figure 8:
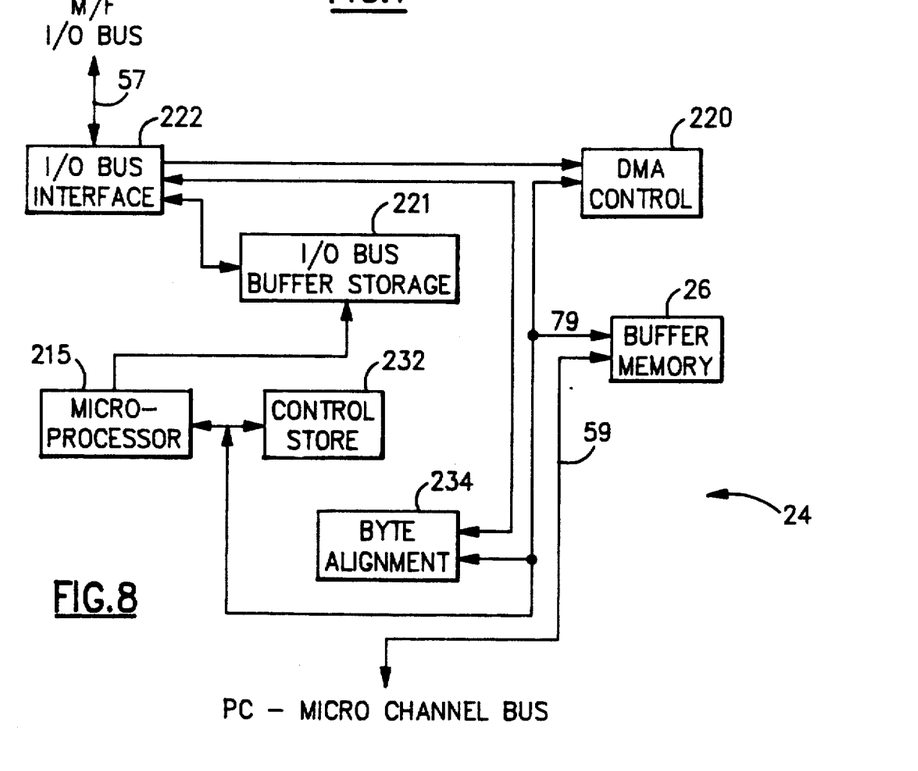
FIG. 8 is a relatively low level block diagram of a bus control unit within the high speed communication link of FIG. 5.
Figure 9:
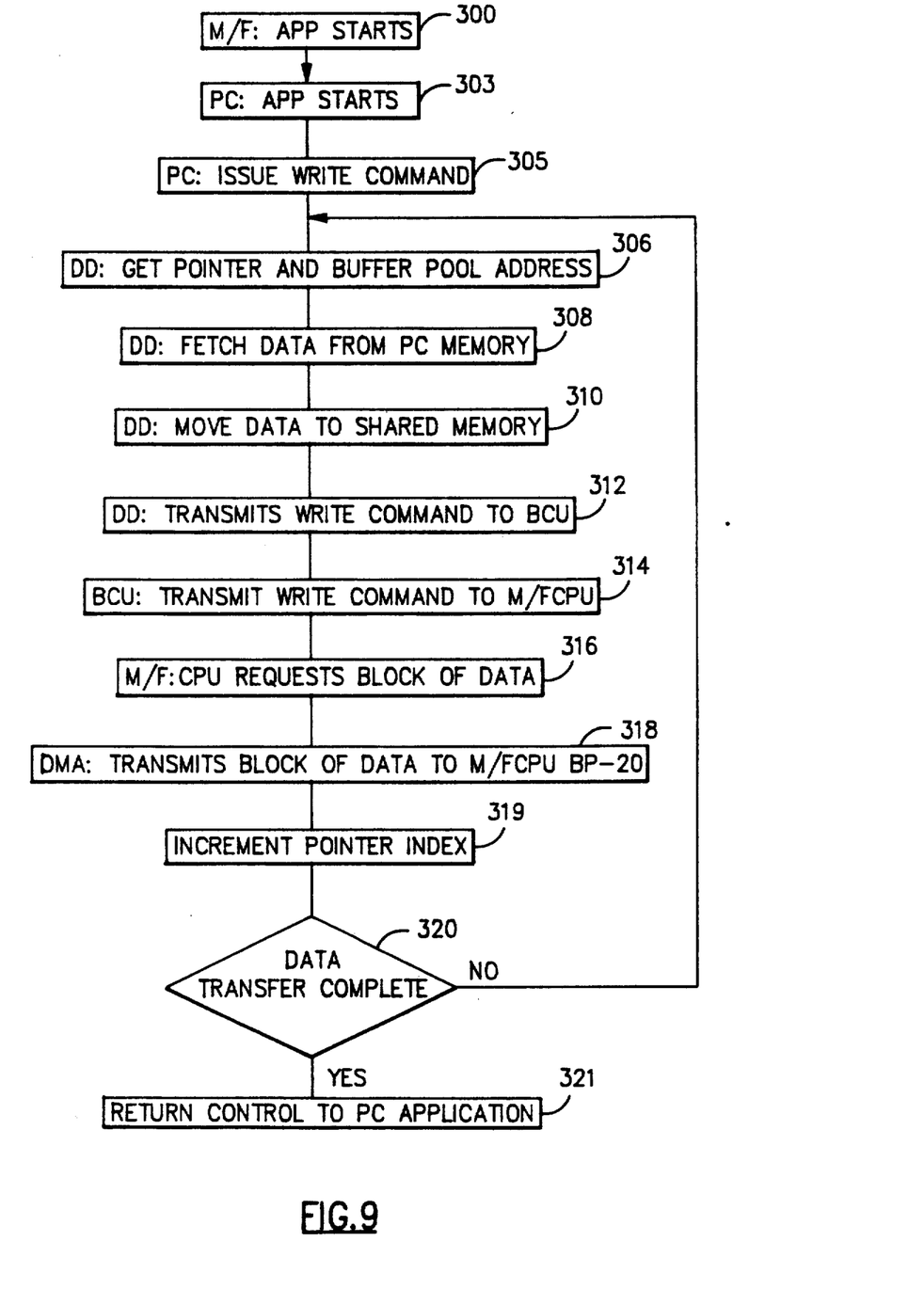
FIG. 9 is a flowchart illustrating use of the high speed communication link of FIG. 5 to transfer data from the PC to the midrange computer.

Bus control unit 24 is further illustrated in FIG. 8, and one mode of control by the device driver in which application 42 transfers data to the midrange computer is illustrated by the flowchart of FIG. 9. In step 300, a user loads and begins to run midrange computer application 40. Application 40 then opens communication link 16 by issuing a "prepare pipe" command in which CPU 41 transmits to bus control unit 24 the location of the two beginning and two end pointers in pipe interface area 22 for queues 18 and 20. This information is received by I/O bus interface 222, forwarded to direct memory access (DMA) control 220 and deposited in shared buffer memory 26.

Next, a user loads and starts application 42 in the PC (step 303), and application 42 issues an "open pipe" command to establish the link with application 40. It should be noted that steps 300 and 303 are executed only at the start of applications 40 and 42, and are not repeated for subsequent data transfers. During the execution of application 42, application 42 issues a "write" command to transmit data to application 40 (step 305). In accordance with one object of the invention, this command is made by application 43 on the initiative of application 43 without prior consultation with the midrange computer. The "write" command includes three components, (1) "pipe handle" which identifies the communication link to application 40, (2) a "data buffer" address which identifies the address in the PC memory 28 (outside of shared memory 26) which contains the data to be transmitted, and (3) a "data count" which identifies the amount of data to be transmitted. This command is received by and activates device driver 30. In response, device driver 30 directs bus control unit 24 to read pipe interface area 22 (step 306) to identify the end point 44, deposit the pointer in shared memory 26, and thereby determine where the address should be read from queue 20. Then, device driver 30 directs bus control unit 24 to read queue 20 to determine the location in buffer pool 7 to receive the data (step 306). Then the actual data is written into this location as follows: Device driver 30 transmits the read command to the bus control unit 24 via line 59 which command is stored in the control area of shared memory 26. The "read" command includes the "read" verb, the address in buffer pool 7 to receive the data, the address shared memory 26 to receive the data, and the length of the data. A control store 232 includes the instruction set for an operating program for microprocessor 215. Microprocessor 215 of bus control unit 24 detects the read command after a periodic check. In response, microprocessor 215 builds a bus message in buffer storage 220 to transmit the read request. The bus message includes the transfer verb "read", the address in buffer pool 7 to receive the information, and the count data. Then, microprocessor 215 transmits a request to CPU 41 (at the microcode level without interrupting the midrange computer operating system) to permit the bus message to be sent to memory 32. CPU 41 subsequently issues the bus request for the bus message, and the message is sent via I/O bus interface 222, I/O bus 57, and memory 32 (outside of pipe interface area 22 and queues 18 and 20). Then, CPU 41 reads the read command in the bus message from memory 32, and in response issues a write command for the requested data in buffer pool 7. This request is made via I/O bus interface 222 and DMA control 220. In response to the write request, DMA control 220 addresses a block of data from PC memory 28 and then reads the block of data from interface 222 and deposits the block into the previously defined location in shared memory 26.

Next, device driver 30 fetches the data from PC memory 28 (outside of shared portion 26) at the location(s) indicated by the "Write" command (step 308). Then, device driver 30 moves the data into the shared portion 26 of the PC memory 28 (step 310). Shared memory 26 comprises five 4K byte buffers for five blocks of data and 12K bytes of control area for read and write commands, address information for the buffer pools, and data count information. Each segment of the buffer pool can accommodate 4K bytes of data.

Next, device driver 30 transmits a "write" command to bus control unit 24 via Micro Channel 59 (step 312), which command is stored in the control area of shared memory 26. The "write" command includes the "write" verb, the buffer pool 7 address to receive the data, the address in shared memory 26 where the data is located and the length of the data.

A microprocessor 215 of bus control unit 24 periodically monitors the control area of shared memory 26, and detects the write command. In response, microprocessor 215 builds a bus message in buffer storage 221 to implement the data transfer (step 314). The bus message includes the data transfer verb (i.e. Write), the address in buffer pool 7, and the count data. Then, microprocessor 215 transmits a request to CPU 41 to permit the bus message to be sent to memory 32. It should be noted that the request is made to CPU 41 at the microcode level; the request does not interrupt the operating system of the midrange computer. Between the processing of the operating system instructions, CPU 41 checks its "mailbox" for such requests, and upon detection of this request, processes the request. While the processing of the microcode request "steals" cycles form CPU 41, this processing is faster than would occur if the operating system 39 were interrupted.

CPU 41 subsequently issues a bus request for the bus message, and the message is sent via I/O bus interface 222, I/O bus 57, and memory 32 (outside of pipe interface area 22 and buffer pools 18 and 20). Then, CPU 41 reads the write command in the bus message from memory 32, and in response, issues a data request for a first block of data (step 316). This request is made via I/O bus interface 222, and DMA control 220, and does not interrupt microprocessor 215. In response to the data request, DMA control 220 fetches the block of data from shared memory 26 and transmits the block of data to buffer 7 via I/O bus interface 222 and I/O bus 57 (step 318). The block of data is then transferred into buffer pool 7 without assistance by CPU 41. Then device driver 30 proceeds to update an index for pointer 44 in pipe interface area 22 (step 319). To make the update, device driver increments the index for pointer 44, and directs bus control unit 24 to transmit the incremented index to pipe interface area 22. Such transmission is accomplished in an analogous manner to the writing of data into buffer pool 7. Steps 306-319 are repeated (decision block 320) for additional blocks of data until all the data originally identified by application 42 is transferred to buffer pool 7. Then, the write operation dictated by application 42 is complete, and application 42 can proceed with its next step (step 321).

Figure 10:
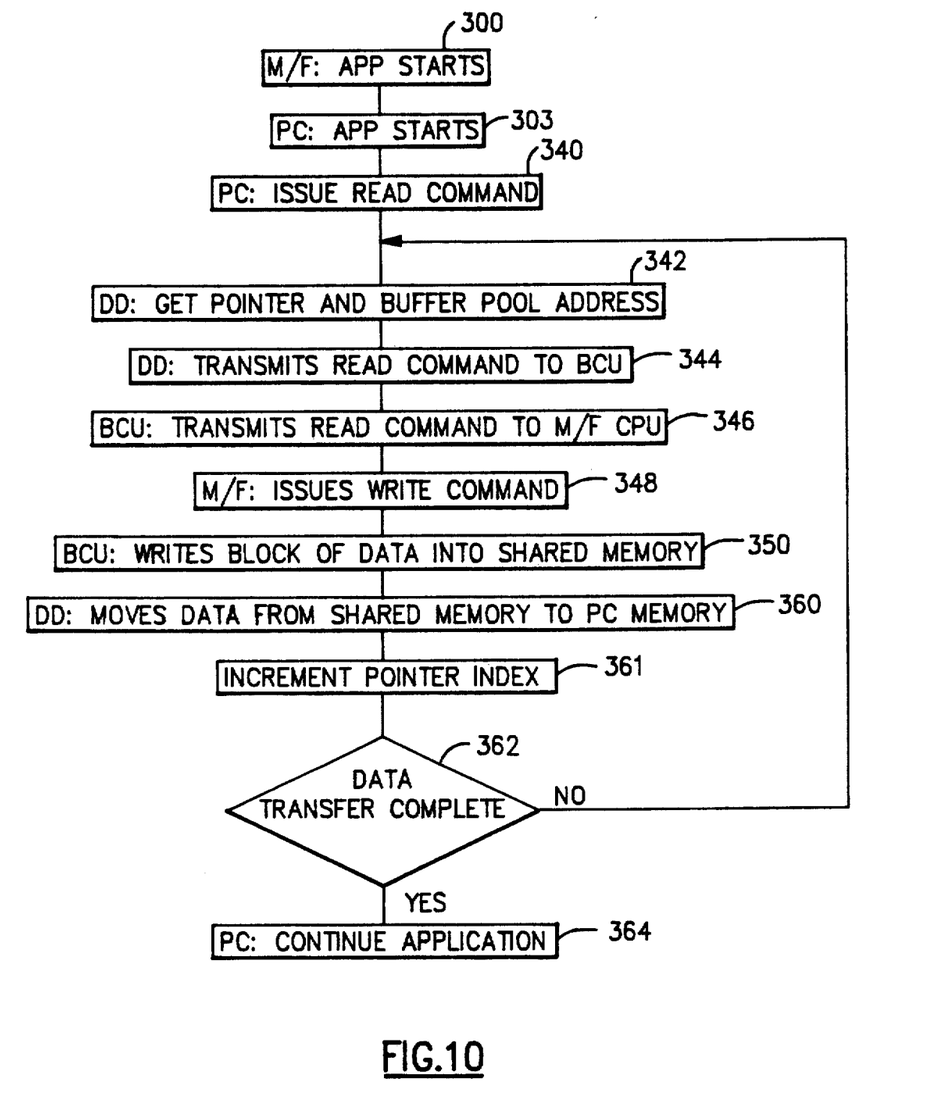
FIG. 10 is a flowchart illustrating use of the high speed communication link of FIG. 5 to transfer data from the midrange computer to the PC.

As described above, the flowchart of FIG. 9 illustrates the ability of PC application 42 on its own initiative to initiate a data transfer into memory 32. FIG. 10 illustrates the ability of application 42 on its own initiative to read data from memory 32 of midrange computer 12 via communication link 16. Steps 300 and 303 of FIG. 6 are the same as in FIG. 9. During the execution of application 42, application 42 issues a "read" command to read data from midrange computer 12 (step 340). The "read" command includes three components, (1) a "pipe handle" which identifies the communication link to application 40, (2) a "data buffer" address which identifies the address in the PC memory which should ultimately receive the read data and (3) a "data count" which identifies the amount of data to be read. This command is received by and activates device driver 30. In response, device driver 30 directs bus control unit 24 to read pipe interface area 22 (step 342), deposit the pointer in shared memory 26, and thereby identify the end point 50 to determine where the address should be read from queue 18. The read operation for reading the address from queue 18 is performed in the manner described above.

Next, device driver 30 transmits the read command to the bus control unit 24 via line 59 (step 344) which command is stored in the control area of shared memory 26. The "read" command includes the "read" verb, the buffer pool 7 address of the data to be read, the address in shared memory 26 to receive the data, and the length of the data. Then, microprocessor 215 of bus control unit 24 detects the read command after a periodic check. In response, microprocessor 215 builds a bus message in buffer storage 221 to transmit the read request (step 346). The bus message includes the transfer verb "read", the address in buffer pool 7 which contains the data, and the count data. Then, microprocessor 215 transmits a request to CPU 41 (at the microcode level without interrupting the midrange computer operating system) to permit the bus message to be sent to memory 32. CPU 41 subsequently issues the bus request for the bus message, and the message is sent (step 346) via I/O bus interface 222 and I/O bus 57 to memory 32 (outside of pipe interface area 22 and buffer pools 7). Then, CPU 41 reads the read command in the bus message from memory 32, and in response issues a write command for the requested data in buffer pool 7. This request is made via I/O bus interface 222 (step 348) and DMA control 220. In response to the write request, DMA control 220 addresses a block of data from buffer pool 7 and then reads the block of data from interface 222 and deposits the block into the previously defined location in shared memory 26 (step 350). Then, device driver 30 moves the block of data from shared memory 26 to the previously defined location in non-shared PC memory 28 (step 360). Then device driver updates (step 361) the index for pointer 50 in pipe interface area 22 (in a similar manner to that described above for pointer 44). Steps 342-361 are repeated for additional blocks of data until the data transfer is complete (step 362). Then the read operation step specified in application 42 is complete and application 42 continues with subsequent steps in the application (step 364).

It should be noted that in the illustrated embodiment of the present invention, PC application 42 does not request the midrange computer CPU 41 to write data into buffer pool 7. Rather, the PC application reads the data subsisting in buffer pool 7. Similarly, PC application 42 does not direct midrange computer 41 to read data from buffer pool 7 obtained from PC application 42. Rather, midrange computer CPU 41 reads the data subsisting there.

FIG. 8 also illustrates that bus control unit 24 includes control store 232 and byte alignment component 234. Byte alignment component 234 is included because, in the illustrated embodiment, midrange computer 12 transmits four byte words whereas PC 14 processes only one byte at a time. Thus, byte alignment component 234 generates a four byte word for transmission (some of which words may be zeros) to the midrange computer, and disassembles four byte words received from the midrange computer for processing by the PC 14. For example, if application 42 requests a single byte, CPU 41 will transmit four bytes and byte alignment component 234 will strip off the requested byte for transmission to the PC.

Further details of the hardware within bus control unit 24 can be obtained from U.S. patent application Ser. No. 07/341,503, entitled "Bus-To-Bus Adapter" filed Apr. 21, 1989 by Alan R. Clark et al., which patent application is hereby incorporated by reference as part of the present disclosure.

FIGS. 5 and 6 also illustrate the low level "roll-your-own" (RYO) API's 70 and 72 which are intended for implementations of additional communication protocols on top of the basic data transfer layers. Roll-your-own API's 70 and 72 provide access to the point-to-point data transfer mechanism between applications 40 and 42. Each roll-your-own API is provided in the form of an interface routine which can be linked to the application. These routines support function calls from the applications which are compiled using for example, an IBM C/2 compiler. In order to support other languages, the interface routine uses a Pascal calling sequence. The roll-your-own API includes the following communication verbs, and provides the following functions. These descriptions specifically pertain to the PS/2 computer, and analogous ones pertain to the midrange computer.

1. OPEN PIPE: This function is used to enable the communication link or pipe 16. If the communication link is already enabled, a return code will indicate this to the roll-your-own API. Otherwise, the communication link will be enabled and made available to the caller. If the communication link is not explicitly disabled after completion of the communication, the communication will be disabled when the application terminates.

2. CLOSE PIPE: This function will disable the communication link or pipe. Any pending data which has been received from the midrange computer will be discarded. In addition, "interface disconnect" error will be reported to the midrange computer to indicate that the communication link has been disabled.

3. READ PIPE: This function will read the next message from the communication link or pipe 16. A function return value will be the size of the message received from the host computer. If there are no pending messages, control will not be returned to the caller until the message is received from the host computer. In system 10, the caller first checks the read status of the pipe prior to using this function.

4. WRITE PIPE: This function will write the next message into the appropriate buffer pool 7. The maximum message size is limited, for example, to 32767 bytes. A function return value will be the size of the message sent to the host computer. If there is not available space in the buffer pool, control will not be returned until the message has been input to the buffer pool.

5. PIPE STATUS: This function will determine if device driver 30 has been installed and activated. A return value will indicate the install status.

6. READ STATUS: This function is used to obtain the current status of the inbound side of the pipe. A return value will indicate the amount of data waiting to be read.

7. WRITE STATUS: This function is used to obtain the current status of the outbound side of the pipe. A return value will indicate the amount of data which can be accepted by the buffer pool.

Each verb is accompanied by the handle corresponding to the set of queues (if more than one set).

Figure 11:
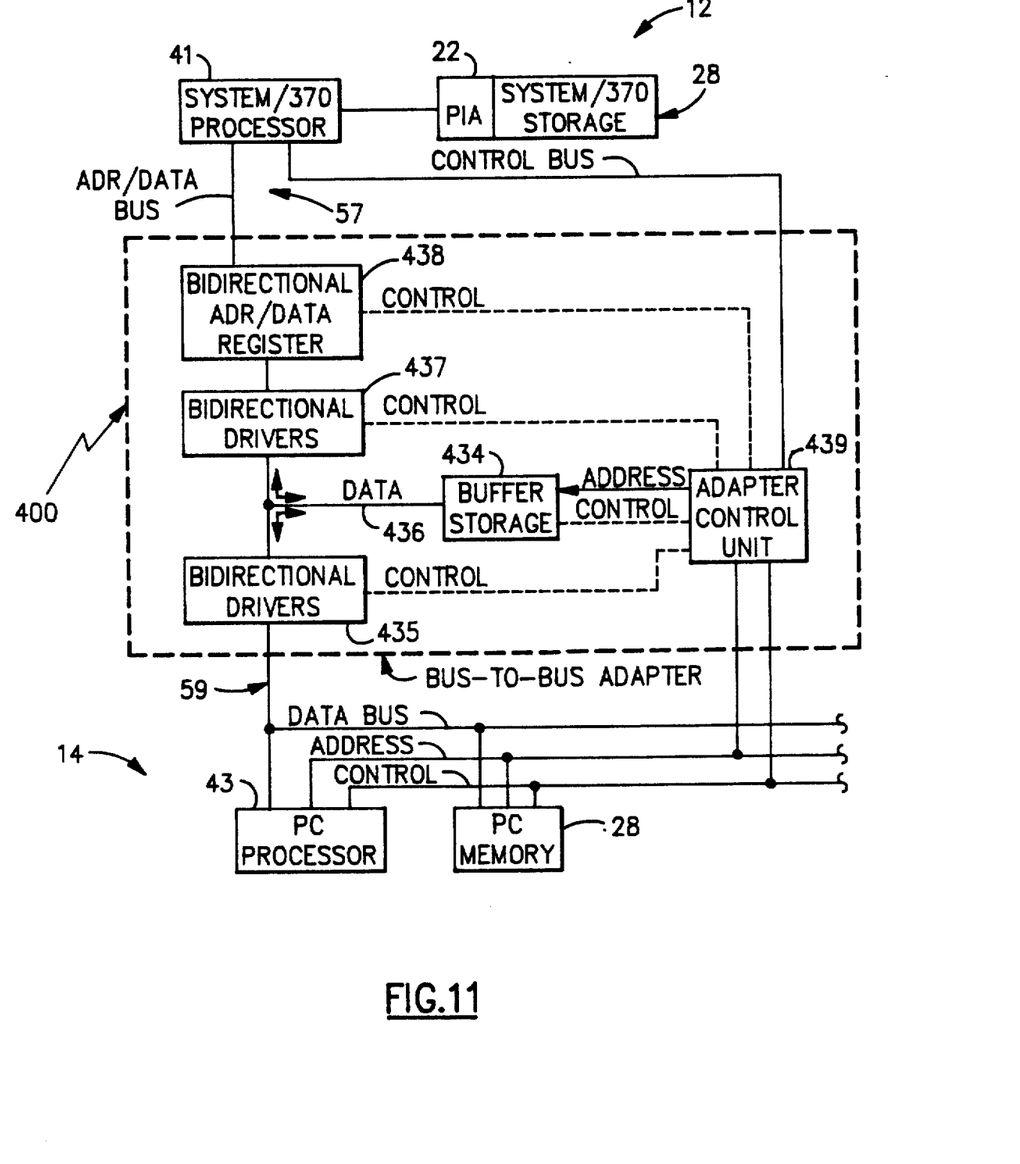
FIG. 11 is a block diagram of an alternate bus control unit for the high speed communication link of FIG. 5.

Another embodiment of the present invention utilizes bus control unit 400 illustrated in FIG. 11 instead of bus control unit 24. Bus control unit 400 couples the input/output (I/O) bus 57 of midrange computer to the input/output (I/O) bus/micro channel 59 of personal computer 14. The I/O bus 57 includes a multi-line address/data bus and a multi-line control bus. The I/O bus 59 includes a multi-line data bus, a multi-line address bus and a multi-line control bus. PC memory 28 is connected to I/O bus 59.

Bus control unit 400 includes a buffer storage unit 434 for storing data supplied by either one of the data processors 41 or 43 and transferring such data to the other one of the data processors. The data and message (ex: Write and Read commands) flow path from the processor 43 to the buffer storage 434 is by way of PC data bus 59, bidirectional drivers 435, and buffer data bus 436. Thus, buffer storage 434 can receive the write command and data from PC 14. The data transfer path between the buffer storage 434 and the processor 41 is provided by buffer data bus 436, bidirectional drivers 437, bidirectional address/data register 438 and the midrange computer address/data bus 57. Thus, the write command and data can be transmitted to the midrange computer 12. Both of these data and message flow paths are bidirectional in nature so that data and messages may flow from the midrange processor 41 to the buffer storage 434. Also, midrange computer transmits the authorization for the PC write operation to adapter control unit 439 via register 438. Adapter control unit 439 controls the operation of the units in the bus control unit 400. The adapter control unit 439 controls, for example, the addressing and read and write (R/W) status of the buffer storage 434. It also controls the operational status and flow direction of the bidirectional drivers 435 and 436 and the address/data register 438. The adapter control unit 439 receives control signals (ex. Read/Write approval) from the midrange processor via the control bus in I/O bus 57, and from the PC processor 43 via its control bus. It also receives address information from the PC processor 43 via its address bus.

Data or messages do not flow directly from the midrange computer processor 41 to the PC processor 43 or vice versa. Message data is first stored in the buffer storage 434 and then read out and supplied to the second processor. The two sets of bidirectional drivers 435 and 437 are not both active at the same time. If bidirectional drivers 435 are turned on for data transfer purposes, then bidirectional drivers 437 are turned off and vice versa.

The buffer storage 434 is organized into addressable lines of data (words of data), each line containing four bytes. The lowest address (zero) is at the top of the map and the highest address is at the bottom of the map. The lower most address range of the buffer storage 434 is dedicated for use by a set of relatively small control blocks. Each control block area has a few lines or words of storage capacity. The remainder of the buffer storage 434 is comprised of a relatively large data buffer area for temporarily storing the data being transferred. This data buffer area may have a capacity of, for example, 32 kilobytes (8,000 words).

One reason for using the buffer storage 434 as an intermediary is the fact that the midrange computer I/O bus 57 can have a considerably different architecture from the PC I/O bus 59. They can have different numbers of data lines, different operating cycle requirements, etc. Thus, it is necessary to reformat or reorganize the data before sending it on to the other data processor.

Figure 12:
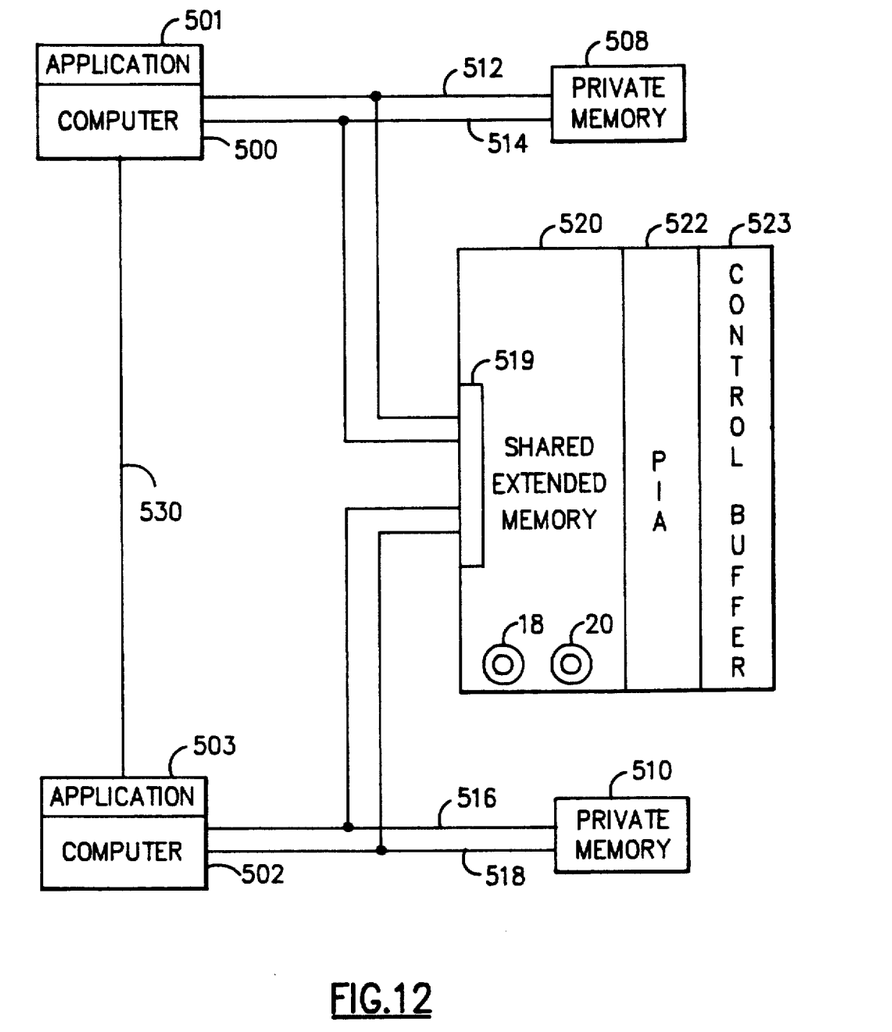
FIG. 12 is a block diagram of an alternate high speed communications facility in accordance with the present invention.

FIG. 12 illustrates another computer architecture which comprises two computers 500 and 502 and respective applications 501 and 503. Either application 501 or 503 can initiate a data transfer. Computer 500 has an IBM System/370 instruction set and by way of example, computer 502 is a personal computer such as an IBM PS/2 computer, an IBM XT ("XT" is a trademark of IBM Corp.) computer, an IBM AT ("AT" is a trademark of IBM Corp.) computer or an IBM RT ("RT" is a trademark of IBM Corp.) computer.

Computer 500 has its own private memory 508 which can be RAM or disc type, and similarly computer 502 has its own private memory 510 which can be RAM or disc type. Accordingly, computer 502 interfaces to memory 508 via address lines 512 and data lines 514 (collectively described as an I/O bus), and computer 504 interfaces to memory 510 via address lines 516 and data lines 518 (collectively described as a Micro Channel internal bus).

FIG. 12 also illustrates a shared extended ("twin-tailed") memory 520 for both computers 500 and 502, which memory is accessed both by address and data lines 512 and 514 and address and data lines 516 and 518. An electronic switch 519 is used to select one set of address and data lines at a time. In other words, either computer can write directly into and read directly from the entirety of shared memory 520. Preferably, shared memory 520 comprises circular queues such as 18 and 20 and corresponding buffer pools such as described above, and can take the form of RAM cards. Shared memory 520 also includes a pipe interface area 522 which includes the end and beginning pointers. Also, adjacent to each pointer is a control word which indicates which computer 500 or 502 has control of the corresponding block of data i.e. which computer can presently write into or read from the block. For example, after computer 502 writes data into a location in the buffer pool memory, computer 502 passes control of that location to computer 500 by appropriate entry into control buffer 523.

FIG. 12 also illustrates a signalling line 530 between computers 500 and 502, to initialize operation, report errors and provide other control functions. However, line 530 is not required for data transfer.

Application 503 can write data directly into shared memory 520. If the data is a result generated by application 503 and computer 502, such as the result of a mathematical operation, then the data is deposited directly from computer 502 into shared memory 520. However, if the data resides in private memory 510, then application transfers the data directly from private memory 510 to shared memory 520. Once in shared memory, computer 500, application 501, computer 502 and application 503 all have immediate access to the data. Because the foregoing data transfers from computer 502 to shared memory 520 occur in one operation, the data transfer rate is optimum.

The following steps are utilized by computer 502 to transfer data into the shared memory 520. First, computer 502 fetches the current pointer address from pipe interface area 522. Second, computer 502 determines from queue 20 the addresses of the corresponding location in the buffer pool memory and then writes the data into the location. Third, computer 502 transmits the control word identifying computer 500 into control buffer 523. Fourth, computer 502 increments the pointer index. Computer 502 executes analogous steps to read data from shared memory 520. Computer 500 follows analogous steps to access (read/write) shared memory 520.

Based on the foregoing, a computer system operating in both master/slave and peer-to-peer relationships have been described. However, numerous modifications and substitutions may be made without deviating from the scope of the invention. For example, other types of computers including mainframes may be utilized, as well as other types of communication links 16. Therefore, the invention has been disclosed by way of illustration and not limitation, and reference may be made to the following claims to determine the scope of the invention.

We claim:

1. A process for providing data communication concurrently between a first computer and a second computer coupled together by a communication link, and between a third computer and said second computer, said second computer having a processor and an associated operating system, said process comprising the steps of:

running an application on the processor and the associated operating system of said second computer;
simultaneously running a different but related application on said first computer;
initiating from the application running on said first computer a write command to write data from said first computer to a buffer pool memory in said second computer, said first computer initiating said write command without specific prior direction from said second computer to initiates said write command, said first computer application having a peer-to-peer relationship to said second computer application insofar as the ability of said first computer application to initiate said write command;
fetching control information by the communication link from said second computer by direct memory access of a memory location containing said control information in said second computer without interrupting said processor, said control information identifying an available location, if any, in said buffer pool memory to receive said data;
transmitting said write command in microcode to said processor of said second computer via said communication link to notify said processor of said write command; and
if said buffer pool memory has an available location to receive said data,
approving of said write command and transmitting said approval onto said communication link, said approving step being performed by said processor by stealing cycles from said processor without interrupting said associated operating system;
writing said data from said first computer into said available location in said buffer pool memory via said communication link by direct memory access from said communication link based on said control information, whereby said processor and associated operating system do not control this writing step and no channel program is required, said second computer application subsequently reading said data from said buffer pool memory; and
controlling by said second computer application and the associated operating system a data transfer between said second computer and said third computer in a master/slave relationship concurrently with the approving of said write command by said processor and while said data from said first computer is being written into said buffer pool memory.

2. A process as set forth in claim 1 wherein said buffer pool memory is identified by a circular first-in first-out queue of addresses, and said data is written into one end of said buffer pool memory, the location of said end changing after said data is written into said buffer pool memory.

3. A process as set forth in claim 1 wherein said first computer is a personal computer, and said second computer has a System/370 architecture.

4. A computer system comprising:
a first computer;
a second computer having a processor and an associated operating system;
a third computer;
first means for communicating between said first computer and said second computer;
second means for communicating between said second computer and said third computer;
means for running an application on said processor and said associated operating system of said second computer;

means for simultaneously running a different but related application on said first computer;

means for initiating from the application running on said first computer a write command in microcode to write data from said first computer to a buffer pool in said second computer, said first computer initiating said write command without specific prior direction from said second computer to initiate said write command, said first computer application having a peer-to-peer relationship to said second computer application insofar as the ability of said first computer application to initiate said write command;

said first communicating means including means for fetching control information from said second computer by direct memory access of a memory location containing said control information within said second computer without interrupting said processor, said control information identifying an available location, if any, in said buffer pool to receive said data;

means for transmitting said write command microcode to said second computer via said first communicating means; and means for approving by said processor of said write command and transmitting said approval onto said first communicating means if said buffer pool has an available location to receive said data, said write command being approved by stealing cycles from said processor without interrupting the associated operating system;

means for writing said data from said first computer into said available location in said buffer pool via said first communicating means by direct memory access from said first communicating means based on said control information if said buffer pool has an available location to receive said data, whereby said processor and associated operating system do not control the writing means, said second computer application subsequently reading said data from said buffer pool; and said second computer application including means for controlling a data transfer between said second computer and said third computer in a master/slave relationship concurrently with the approving of said write command by said processor and while said data from said first computer is being written into said buffer pool.

5. A computer system as set forth in claim 4 wherein:

said first computer includes first transfer layer means, connected to said first communicating means, for converting said write command to said microcode and routing said data from said first computer to said second computer via said first communicating means; and first application interface means, connected to said first transfer layer means, for interfacing between said application running in aid first computer and said first transfer layer means, said first transfer layer means also having a roll-your-own interface for said application running in said first computer, each of said first application interface means and said roll-your-own interface capable of supporting said write command; and said second computer includes:

second transfer layer means, connected to said first communicating means, for routing data and said approval to said first computer via said first communicating means; and second application interface means, connected to said second transfer layer means, for interfacing between said application running in said second computer and said second transfer layer means, said second transfer layer means also having a roll-your-own interface for said application running in said second computer.

6. A process as set forth in claim 1 wherein said second computer application controls said data transfer between said second computer and said third computer using a channel program.

* * * * *